United States Patent
Grant et al.

(10) Patent No.: US 11,122,198 B2
(45) Date of Patent: Sep. 14, 2021

(54) ADJUSTING IMAGE CAPTURE PARAMETERS VIA MACHINE LEARNING

(71) Applicant: International Business Machines Corporation, Armonk, NY (US)

(72) Inventors: Robert H. Grant, Atlanta, GA (US); Shikhar Kwatra, Durham, NC (US); Zachary A. Silverstein, Jacksonville, FL (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/736,637

(22) Filed: Jan. 7, 2020

(65) Prior Publication Data

US 2021/0211575 A1 Jul. 8, 2021

(51) Int. Cl.
*H04N 5/232* (2006.01)
*G06T 7/73* (2017.01)

(52) U.S. Cl.
CPC ........... *H04N 5/23222* (2013.01); *G06T 7/75* (2017.01); *H04N 5/23216* (2013.01); *H04N 5/23232* (2013.01); *G06T 2207/20081* (2013.01); *G06T 2207/20084* (2013.01)

(58) Field of Classification Search
CPC ........... H04N 5/23222; H04N 5/23216; H04N 5/23232; G06T 7/75; G06T 2207/20081; G06T 2207/20084
See application file for complete search history.

(56) References Cited

U.S. PATENT DOCUMENTS

| 5,749,000 A | 5/1998 | Narisawa |
| 9,560,271 B2 | 1/2017 | Na et al. |
| 2013/0235254 A1 | 9/2013 | Fillbrandt et al. |

(Continued)

FOREIGN PATENT DOCUMENTS

| CN | 104333700 A | 2/2015 |
| CN | 105635555 A | 6/2016 |
| CN | 108305223 A | 7/2018 |

OTHER PUBLICATIONS

Meet Arsenal, the intelligent assistant for your DSLR or mirrorless camera. Arsenal, Accessed on Feb. 14, 2019. [7 printed pages] <https://witharsenal.com/features>.

*Primary Examiner* — Gevell V Selby
(74) *Attorney, Agent, or Firm* — The Steadman Law Firm PLLC

(57) ABSTRACT

Techniques are described with respect to adjusting image capture parameters. An associated method includes constructing an image capture learning model based upon data collection. The method further includes receiving, via at least one lens of an image capture device, at least one captured image from a client and parsing the at least one captured image to identify a plurality of discrete objects. The method further includes assigning a relevancy score to each of the plurality of discrete objects in the at least one captured image based upon analysis of a plurality of contextual inputs in view of the image capture learning model and determining at least one captured image modification option. Each of the at least one captured image modification option includes at least one photographic adjustment to the plurality of discrete objects in the at least one captured image based upon assigned relevancy score.

20 Claims, 5 Drawing Sheets

(56) References Cited

U.S. PATENT DOCUMENTS

| | | |
|---|---|---|
| 2013/0329068 A1 | 12/2013 | Hamanaka et al. |
| 2016/0182816 A1 | 6/2016 | Luk et al. |
| 2017/0069097 A1 | 3/2017 | Molgaard et al. |
| 2017/0070720 A1 | 3/2017 | Bishop et al. |
| 2019/0080347 A1* | 3/2019 | Smith .................... G06N 5/022 |
| 2019/0129962 A1* | 5/2019 | Singh .................... G06F 16/538 |
| 2019/0218405 A1* | 7/2019 | Seguchi ................ C09D 11/033 |
| 2019/0354802 A1* | 11/2019 | Lin ...................... G06K 9/4628 |

* cited by examiner

ADJUSTING IMAGE CAPTURE PARAMETERS VIA MACHINE LEARNING

BACKGROUND

The various embodiments described herein generally relate to machine learning. More specifically, the various embodiments relate to adjusting parameters of at least one captured image using machine learning techniques.

In the context of photography, image capture parameters often are adjusted to address needs or preferences with respect to a client and/or entities associated with a client. Photographic adjustments may emphasize one or more objects within a captured image relative to one or more other objects. Such adjustments may be made prior to and/or subsequent to image capture.

SUMMARY

The various embodiments described herein provide techniques of adjusting image capture parameters via machine learning. An associated computer-implemented method includes constructing an image capture learning model based upon data collection. The method further includes receiving, via at least one lens of an image capture device, at least one captured image from a client and parsing the at least one captured image to identify a plurality of discrete objects. The method further includes assigning a relevancy score to each of the plurality of discrete objects in the at least one captured image based upon analysis of a plurality of contextual inputs in view of the image capture learning model. The method further includes determining at least one captured image modification option, wherein each of the at least one captured image modification option includes at least one photographic adjustment to the plurality of discrete objects in the at least one captured image based upon assigned relevancy score. In an embodiment, the method includes presenting to the client the at least one captured image modification option. In another embodiment, the method includes facilitating at least one further photographic adjustment to the at least one captured image based upon at least one command received from the client. In a further embodiment, the method includes facilitating at least one further photographic adjustment to the at least one captured image based upon data collected by at least one monitoring sensor. In a further embodiment, the method includes facilitating adjustment of at least one pre-capture image parameter in view of the image capture learning model prior to capture of a subsequent image via the image capture device. In a further embodiment, the method includes facilitating adjustment of at least one element of photographic equipment in view of the image capture learning model prior to capture of a subsequent image via the image capture device. In a further embodiment, the at least one captured image is a series of captured images.

In an embodiment, the step of constructing the image capture learning model includes archiving image capture data associated with a plurality of environments, collecting profile data associated with the client, training the image capture learning model based upon the archived image capture data and the collected profile data associated with the client to derive a normalized output for respective discrete objects, and defining profiles for the respective discrete objects including the normalized output. In another embodiment, the step of training the image capture learning model includes parsing metadata from the archived image capture data and the collected profile data associated with the client and applying at least one machine learning algorithm based upon the parsed metadata. In a further embodiment, the at least one machine learning algorithm is applied in conjunction with a recurrent neural network architecture configured to store time series pattern data with respect to textual aspects of the archived image capture data and the collected profile data associated with the client. In a further embodiment, the step of applying the at least one machine learning algorithm includes applying an activation function in order to obtain the normalized output for the respective discrete objects.

In an embodiment, the step of assigning a relevancy score to each of the plurality of discrete objects in the at least one captured image includes identifying any representation of the discrete object in the plurality of contextual inputs and comparing any identified representation of the discrete object to a defined profile of the discrete object in the image capture learning model. The step of assigning a relevancy score to each of the plurality of discrete objects in the at least one captured image further includes determining the relevancy score for the discrete object based upon the comparison.

One or more additional embodiments pertain to a computer program product including a computer readable storage medium having program instructions embodied therewith. According to such embodiment(s), the program instructions may be executable by a computing device to cause the computing device to perform one or more steps of and/or to implement one or more aspects associated with the above recited computer-implemented method. One or more further embodiments pertain to a system having a processor and a memory storing an application program, which, when executed on the processor, performs one or more steps and/or implements one or more aspects of the above recited computer-implemented method.

BRIEF DESCRIPTION OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
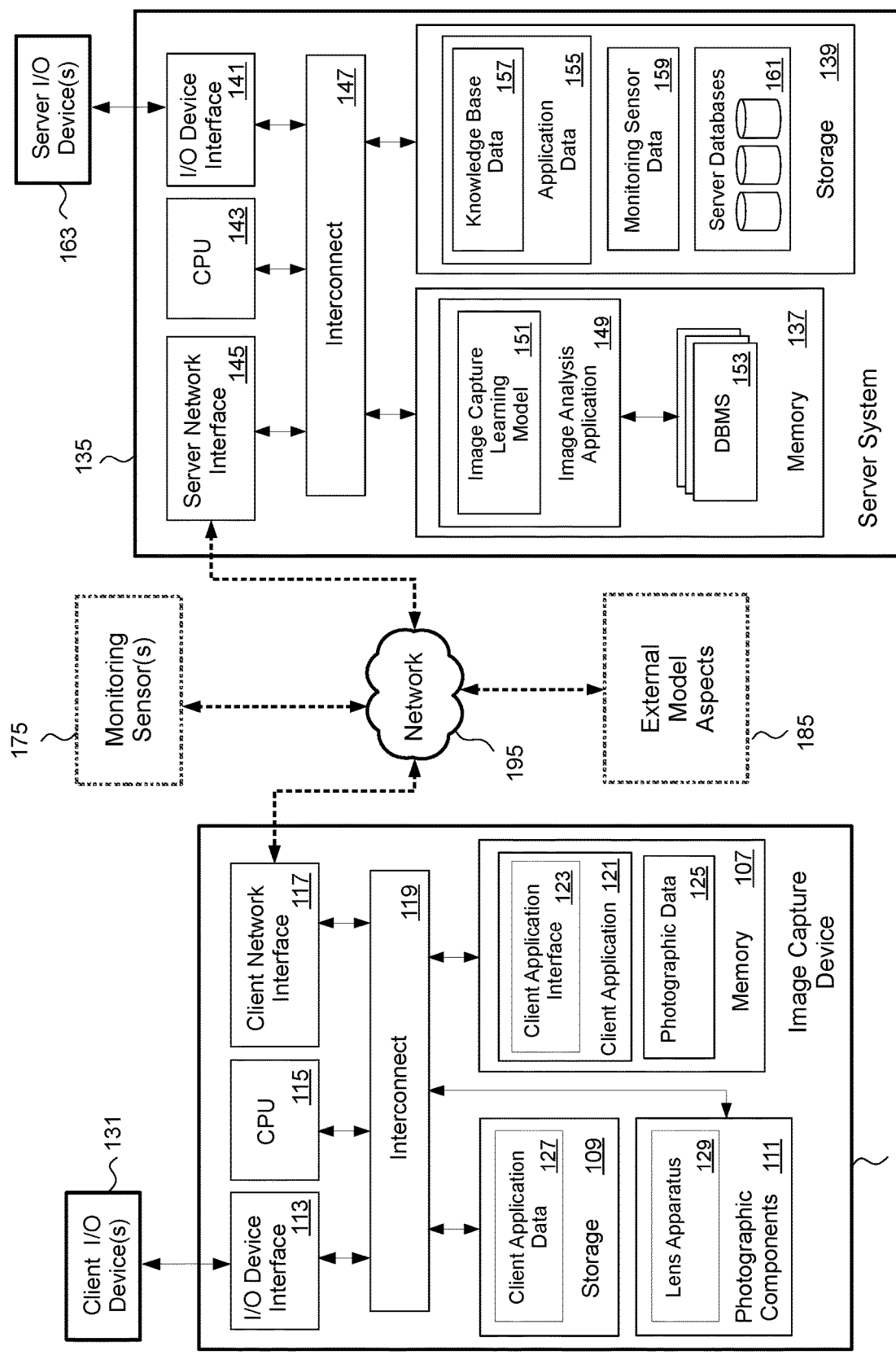
FIG. 1 illustrates a computing infrastructure, according to one or more embodiments.

The various embodiments described herein are directed to adjusting parameters with respect to at least one captured image. The at least one captured image optionally is created and/or processed via an image capture device. In the context of the various embodiments, an image capture device is any hardware device capable of capturing images. An image capture device optionally includes software to facilitate and/or enhance image capture. An image capture device may be or may include a still image camera, a video camera (conventional video camera or still video camera), a mobile device (e.g., a smartphone or a laptop) having image capture capabilities, etc.

The various embodiments described herein may have advantages over conventional techniques. Specifically, the various embodiments may facilitate automation of image capture parameter adjustment based upon machine learning. Specifically, the various embodiments may improve computer technology by parsing at least one captured image in view of an image capture learning model in order to identify discrete objects and to determine at least one captured image modification option with respect to such discrete objects. Furthermore, the various embodiments may improve computer technology by facilitating at least one further photographic adjustment to the at least one captured image in view of the image capture learning model based upon at least one client command and/or based upon sensor data. Additionally, the various embodiments may improve computer technology by facilitating adjustment of at least one pre-capture image parameter and/or of photographic equipment in view of the image capture learning model prior to capture of a subsequent image via the image capture device. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and are not considered elements or limitations of the appended claims except where explicitly recited in a claim(s) Likewise, reference to "the invention" shall not be construed as a generalization of any inventive subject matter disclosed herein and shall not be considered to be an element or limitation of the appended claims except where explicitly recited in one or more claims.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions also may be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions also may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Particular embodiments describe techniques relating to image capture parameter adjustment. However, it is to be understood that the techniques described herein may be adapted to a variety of purposes in addition to those specifically described herein. Accordingly, references to specific embodiments are included to be illustrative and not limiting.

FIG. 1 illustrates a computing infrastructure 100, according to an embodiment. As shown, computing infrastructure 100 includes an image capture device 105, a server system 135, one or more monitoring sensors 175, and external aspects 185 related to an image capture learning model (i.e., external model aspects), each connected to a communications network 195.

Illustratively, image capture device 105 includes, or is otherwise operatively coupled to, a memory 107, storage 109, photographic components 111, an input/output (I/O) device interface 113, a central processing unit (CPU) 115, and a client network interface 117, all of which are interconnected via interconnect 119 (e.g., a bus). One or more aspects of image capture device 105 are accessed or controlled by one or more clients. Although shown as a single device, image capture device 105 is included to be representative of a single device/computing system or multiple devices/computing systems. One or more clients associated with image capture device 105 (or multiple respective image capture devices) may include at least one entity (i.e., individual or group) associated with image capture. Memory 107 includes a client application 121 and photographic data 125. In an embodiment, client application 121 is an online application configured for interfacing with server system 135 and other computing systems. Additionally or alternatively, client application 121 is configured to control or otherwise interface with photographic components 111. Client application 121 includes a client application interface 123. Client application interface 123 optionally includes one or more photographic viewfinder(s), screen(s), and/or other display interface(s) for viewing and/or processing one or more images captured via photographic components 111. Client application interface 123 includes at least one graphical user interface (GUI), at least one command line interface (CLI), and/or at least one sensory interface (e.g., capable of discerning and processing client sound/voice commands and/or client gestures). Photographic data 125 includes image data captured via photographic components 111 and optionally metadata associated therewith.

Storage 109 includes client application data 127 associated with client application 121. Photographic components 111 include lens apparatus 129. Lens apparatus 129 includes at least one lens configured to capture images and/or image data. One or more components of at least one GUI, at least one CLI, and/or at least one sensory interface included in client application interface 123 may facilitate client input and/or may facilitate display of client application data 127. I/O device interface 113 is communicatively coupled to client I/O device(s) 131 (e.g., touchscreen console, trackpad, joystick, microphone, speaker, etc.). The client(s) may interact with client application interface 123 via the client I/O device(s) 131. CPU 115 is included to be representative of a single CPU, multiple CPUs, a single CPU having multiple processing cores, and the like. Client network interface 117 is configured to receive data from and transmit data to server system 135 via network 195.

In an embodiment, image capture device 105 includes augmented reality capabilities such that image capture device 105 is capable of rendering and displaying a digital overlay within client application interface 123, e.g., via a GUI or any other interface capable of displaying a digital overlay. According to such embodiment, the digital overlay optionally is imposed upon at least one captured image in order to graphically represent at least one captured image modification or other photographic adjustment option with respect to the at least one captured image. In a further embodiment, one or more other client devices or systems optionally facilitate image capture and/or image processing in conjunction with image capture device 105. According to such further embodiment, one or more additional instances of client application 121 and/or additional photographic components 111 optionally are accessible via or otherwise associated with such one or more other client devices.

Although shown as a single computing system, server system 135 is included to be representative of a single server system or multiple server systems. In an embodiment, server system 135 includes a single hardware server configured to provide hosting capabilities. In an alternative embodiment, server system 135 includes, or is otherwise operatively coupled to, a plurality of hardware and/or virtualized servers configured to provide hosting capabilities. In a further alternative embodiment, server system 135 is a cloud server system configured to provide distributed hosting capabilities via a plurality of nodes in a cloud computing environment. According to such further alternative embodiment, the cloud computing nodes are configured to communicate with one another. Additionally, according to such further alternative embodiment, the cloud computing environment optionally offers infrastructure, platforms, and/or software as a service for which image capture device 105 or other systems/devices associated with computing infrastructure 100 need not maintain resources locally.

Illustratively, server system 135 includes, or is otherwise operatively coupled to, memory 137, storage 139, an I/O device interface 141, a CPU 143, and a server network interface 145, all of which may be interconnected via interconnect 147 (e.g., a bus). Memory 137 includes an image analysis application 149. Image analysis application 149 includes or is otherwise operatively coupled to an image capture learning model representation 151. In an embodiment, image analysis application 149 is configured to execute one or more artificial intelligence (e.g., machine learning) algorithms utilizing one or more machine learning techniques via image capture learning model representation 151. According to such embodiment, image capture learning model representation 151 includes or is otherwise operatively coupled to the image capture learning model and at least one knowledge base associated therewith. According to such embodiment, some or all aspects of the image capture learning model may run within server system 135. Additionally or alternatively, the image capture learning model includes external model aspects 185, which may run externally to server system 135, e.g., via a cloud-based implementation. In such case, server system 135 communicates with or accesses external model aspects 185 via image capture learning model representation 151. External model aspects 185 include any externally located archived image capture data and/or collected client profile data associated with the image capture learning model. Some or all aspects of the at least one knowledge base optionally are incorporated into server system 135. Alternatively, some or all aspects of the at least one knowledge base are externally located and communicatively coupled to server system 135. Memory 137 further includes or is otherwise operatively coupled to database management system (DBMS) 153. DBMS 153 is included to be representative of a single database system or multiple database systems. Image analysis application 149 is configured to manage captured image processing according to the various embodiments described herein. In an embodiment, image analysis application 149 facilitates any necessary authentication of image capture device 105 and/or other client systems/devices in computing infrastructure 100. In an alternative embodiment, image analysis application 149 sends authentication information associated with image capture device 105 and/or other client systems/devices to an external directory server system, which may in turn perform any necessary authentication steps. In an embodiment, some or all aspects of image analysis application 149 functionality optionally are cloud-based. Hosting some or all functional aspects of image analysis application 149 via a cloud service enables utilization of image analysis application capabilities by a plurality of different clients and/or by a single client through a plurality of different image capture devices.

Storage 139 includes image analysis application data 155. Image analysis application 149 generates and processes image analysis application data 155 based on interaction with other components of computing infrastructure 100. Image analysis application data 155 includes knowledge base data 157 generated by, used by, or otherwise associated with the image capture learning model. Knowledge base data 157 includes datapoints pertaining to image capture history, client profile aspects, and/or archived image capture details. In an embodiment, knowledge base data 157 includes data associated with the at least one knowledge base. Storage 139 further includes monitoring sensor data 159 associated with (e.g., received from) the one or more monitoring sensors 175. Storage 139 further includes server databases 161. DBMS 153 includes or interfaces with at least one software application configured to manage server databases 161. In an embodiment, image analysis application 149 sends database requests to DBMS 153 and processes results returned by DBMS 153. In a further embodiment, server databases 161 include one or more relational databases. In an additional embodiment, server databases 161 include one or more ontology trees or other ontological structures. While FIG. 1 depicts three databases among server databases 161, server system 135 (and more generally computing infrastructure 100) may include any number of databases. According to a further embodiment, DBMS 153 sends requests to remote databases (not shown) via network 195.

I/O device interface 141 is communicatively coupled to server I/O device(s) 163. CPU 143 is included to be representative of a single CPU, multiple CPUs, a single CPU having multiple processing cores, and the like. Server network interface 145 is configured to receive data from and transmit data to image capture device 105 or other client device(s)/system(s) via network 195. Specifically, image analysis application 149 is configured to accept requests sent by image capture device 105 or other client system(s)/device(s) to server system 135 and is configured to transmit data to image capture device 105 or other client system(s) via server network interface 145. Furthermore, server network interface 145 is configured to receive data from and/or transmit data to the one or more monitoring sensors 175.

The one or more monitoring sensors 175 are Internet of Things (IoT) sensors capable of communicating with other systems or devices in computing infrastructure 100, including image capture device 105 and server system 135. In an embodiment, the plurality of mobility device sensors 175 include analog sensors and/or digital sensors. All or a subset of the one or more monitoring sensors 175 optionally include both analog characteristics and digital characteristics. In another embodiment, all or a subset of the one or more monitoring sensors 175 are located on, attached to, or otherwise associated with image capture device 105. In a further embodiment, all or a subset of the one or more monitoring sensors 175 optionally include one or more video capture and/or video monitoring devices configured to record or otherwise process video data with respect to a client or other entity associated with image capture device 105. Additionally or alternatively, all or a subset of the one or more monitoring sensors 175 optionally include one or more audio capture devices (e.g., microphone), one or more audio recorders, and/or one or more audio monitoring devices configured to record or otherwise process audio data with respect to a client or other entity associated with image capture device 105. Additionally or alternatively, all or a subset of the one or more monitoring sensors 175 optionally include one or more audiovisual capture and/or audiovisual monitoring devices configured to record or otherwise process audiovisual data with respect to a client or other entity associated with image capture device 105. Additionally or alternatively, all or a subset of the one or more monitoring sensors 175 optionally include one or more photographic capture devices or other image capture devices configured to capture one or more images or other photographic data with respect to a client or other entity associated with image capture device 105.

In an alternative embodiment, one or more aspects of server system 135, including some or all aspects of image analysis application 149, image capture learning model representation 151, and/or knowledge base data 157, are incorporated into image capture device 105. According to such alternative embodiment, some or all aspects of image analysis application 149 optionally communicate with one or more monitoring sensors 175 and/or external model aspects 185 via client network interface 117 of image capture device 105.

Figure 2:
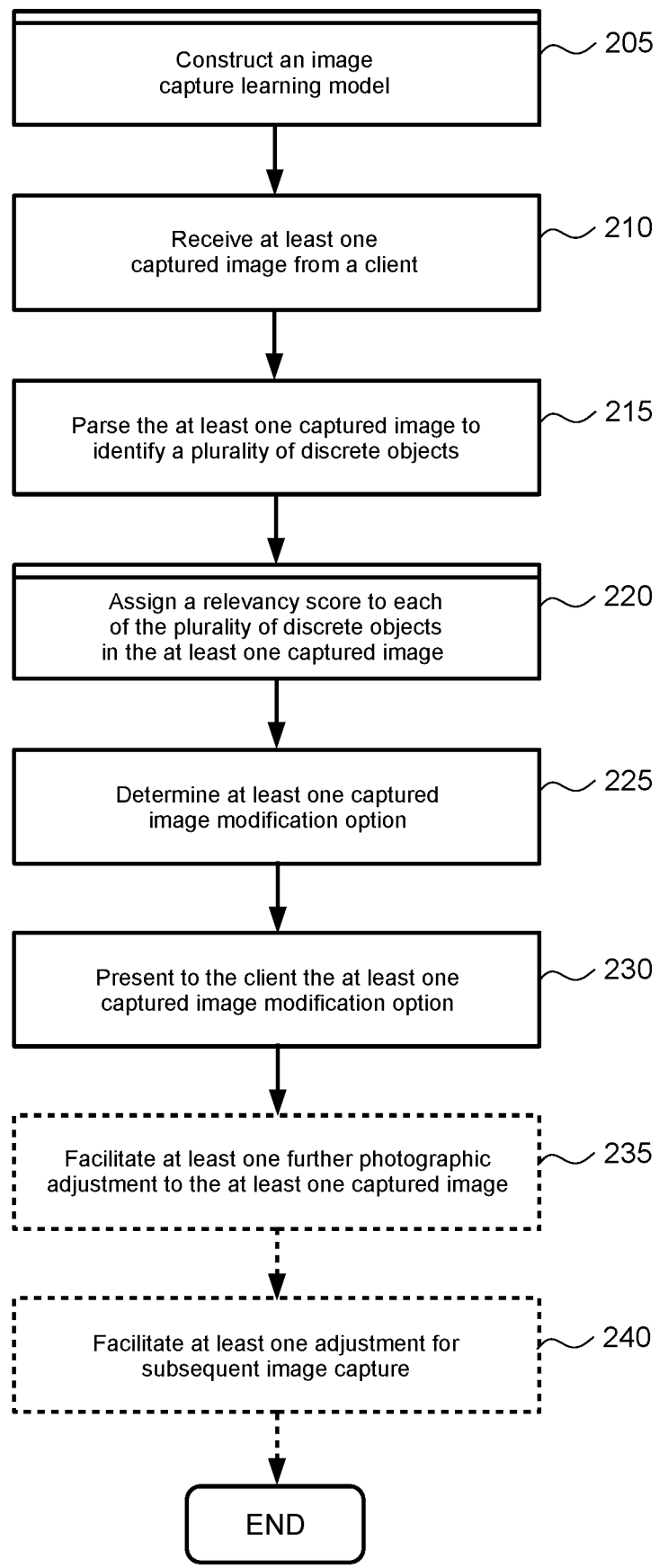
FIG. 2 illustrates a method of adjusting image capture parameters via machine learning, according to one or more embodiments.

FIG. 2 illustrates a method 200 of adjusting image capture parameters via machine learning. One or more steps associated with the method 200 and the other methods described herein may be carried out in a client-server computing environment (e.g., computing infrastructure 100) including a network (e.g., network 195). An image analysis application (e.g., image analysis application 149 in server system 135 of computing infrastructure 100) facilitates processing according to the method 200 and the other methods described herein. The image analysis application interacts with a client via a client interface associated with a client application of an image capture device (e.g., client application interface 123 associated with client application 121 of image capture device 105). The client interface optionally includes at least one image capture viewfinder, at least one screen, and/or at least one other display configured to view and/or process image data. In the context of the method 200 and the other methods described herein, a client is any entity (e.g., individual or group) associated with image processing with respect to an image capture device. In an embodiment, the client interface optionally includes a graphical display having augmented reality capabilities for viewing one or more settings or enhancements overlaid upon at least one captured image. In an embodiment, one or more steps associated with the method 200 and the other methods described herein may be carried out within one or more workloads of a cloud computing environment. Additionally or alternatively, one or more steps associated with the method 200 and the other methods described herein may be carried out in a peer-to-peer network environment, in which case one or more of the method steps described herein may be carried out via a peer application of a peer computing system. In accordance with an alternative embodiment in which the image analysis application or processing capabilities thereof the are incorporated into the image capture device, one or more steps associated with the method 200 and the other methods described herein may be carried out within the image capture device.

In the context of the method 200 and the other methods described herein, the image analysis application provides (or is capable of providing) a client (or a legal representative of the client) as well as any other entity associated with image capture advance notice of any personal data collection, including data collection via an image capture device and/or one or more monitoring sensors associated with an image capture device. The image analysis application further provides any affected entity an option to opt in or opt out of any such personal data collection at any time. Optionally, the image analysis application further transmits at least one notification to any affected entity each time any such personal data collection occurs.

The method 200 begins at step 205, where the image analysis application constructs an image capture learning model based upon data collection. The image capture learning model is a type of machine learning knowledge model. In an embodiment, the image analysis application stores image capture data among knowledge base data (e.g., knowledge base data 157) in at least one knowledge base associated with the image capture learning model. The at least one knowledge base may be referred to as a knowledge corpus. The image analysis application interfaces with the image capture learning model via a model representation (e.g., image capture learning model representation 151). In a further embodiment, the data collection pertains to historical image data, e.g., relating to previously captured images. Additionally or alternatively, the data collection pertains to client data. A method of constructing the image capture learning model in accordance with step 205 is described with respect to FIG. 3.

At step 210, the image analysis application receives, via at least one lens of an image capture device (e.g., at least one lens of lens apparatus 129 of image capture device 105), at least one captured image from a client. In an embodiment, the client sets pre-capture image parameters for the image capture device, e.g., focus, zoom, resolution, etc. In the context of the various embodiments, pre-capture image parameters pertain to pre-capture aspects of at least one image to be captured. Pre-capture image parameters optionally include physical settings (such as optical zoom) and/or digital settings (such as digital zoom) associated with the image capture device selected by the client prior to image capture. In a further embodiment, the at least one captured image is a single image or a burst of images, e.g., captured in a still image photographic context. Alternatively, the at least one captured image is a series of captured images, e.g., captured in a video context. The series of captured images optionally is captured within a relatively short timeframe (e.g., within a period of milliseconds or seconds) or alternatively over a relatively lengthy timeframe (e.g., for purposes of time-lapse photography).

At step 215, the image analysis application parses the at least one captured image to identify a plurality of discrete objects. In the context of the various embodiments, a discrete object is an object that is distinctly identifiable (i.e., separately identifiable) within a captured image, e.g., a human, a road, a car, an environmental aspect such as a tree, etc. In an embodiment, the image analysis application applies one or more machine learning (e.g., deep learning) features of the image capture learning model in order to parse the at least one captured image for discrete object identification. According to such embodiment, the image analysis application identifies one or more of the plurality of discrete objects based upon audiovisual processing of the at least one captured image, e.g., via application of at least one audiovisual processing machine learning algorithm in the context of the image capture learning model. For instance, the image analysis application identifies one or more of the plurality of discrete objects by applying at least one object detection algorithm. One such object detection algorithm is a region-convolutional neural network (R-CNN) algorithm, which focuses upon region-based detection. Another object detection algorithm is a You Only Look Once (YOLO) algorithm, which is a real-time algorithm prioritizing detection based upon speed and recognition rather than region-based detection. In another instance, the image analysis application identifies one or more of the plurality of discrete objects based upon a speech recognition algorithm and/or a gesture recognition algorithm. Additionally or alternatively, the image analysis application identifies one or more of the plurality of discrete objects based upon natural language processing (NLP) with respect to any textual description and/or metadata associated with the at least one captured image, e.g., via application of at least one NLP machine learning algorithm in the context of the image capture learning model. For instance, the image analysis application identifies one or more textual aspects related to the plurality of discrete objects based upon natural language understanding (NLU) and/or latent Dirichlet allocation (LDA). Based upon NLP applied to the identified one or more textual aspects, the image analysis application optionally determines at least one semantic meaning associated with the at least one captured image and/or one or more of the plurality of discrete objects.

In an embodiment, the image analysis application identifies the plurality of discrete objects at least in part by comparing detected objects within the at least one captured image with respective discrete objects for which profiles are defined in the image capture learning model constructed at step 205. Such defined profiles are further described herein with respect to FIG. 3. In another embodiment, the image analysis application parses the at least one captured image to determine photographic parameters with respect to the at least one captured image overall and/or the identified plurality of discrete objects. In the context of the various embodiments described herein, a photographic parameter is an adjustable visual aspect associated with an image. According to such embodiment, the image analysis application parses the at least one captured image to determine resolution/blur level, focus, contrast, color, zoom level, depth of field setting, and/or tilt-shift setting with respect to the at least one captured image overall and/or the identified plurality of discrete objects. According to such embodiment, the image analysis application optionally parses the at least one captured image by focal layer and classifies the identified plurality of discrete objects based upon focal layer. In a further embodiment, the image analysis application updates the image capture learning model based upon parsed elements of the at least one captured image. According to such further embodiment, the image analysis application adds image capture datapoints to archived image capture data of the image capture learning model. Such image capture datapoints optionally include photographic parameters related to the identified plurality of discrete objects and/or metadata pertaining to the at least one captured image, e.g., image location(s) and/or image date(s).

At step 220, the image analysis application assigns a relevancy score to each of the plurality of discrete objects in the at least one captured image identified at step 215 based upon analysis of a plurality of contextual inputs in view of the image capture learning model. The image analysis application analyzes the plurality of contextual inputs to identify at least one client objective associated with the at least one captured image, e.g., purpose(s) and/or theme(s) associated with the at least one captured image. In an embodiment, the image analysis application identifies and/or processes the plurality of contextual inputs based upon data collected by at least one monitoring sensor (e.g., one or more monitoring sensors 175). According to such embodiment, one or more of the at least one monitoring sensor optionally are incorporated into or attached to the image capture device. One or more of the at least one monitoring sensor optionally are specialized sensors configured to capture client input and/or environmental input. According to such embodiment, IoT monitoring sensors on the image capture device or one or more other devices associated with the client monitor conditions in real time within a predefined vicinity of image capture in order to collect sensor data pertaining to any perceived contextual input.

In an embodiment, the plurality of contextual inputs include geographic and/or location information associated with the at least one captured image, e.g., pertaining to topography, natural resources, demographics, political boundaries, climate, cultural attractions, restaurants, amusements, etc. Such geographic/location information optionally is obtained via GPS and/or another location detection service. In a further embodiment, the plurality of contextual inputs include date and/or time information associated with the at least one captured image. In a further embodiment, the plurality of contextual inputs include any current activities associated with the client and/or at least one entity (individual or group) associated with the client (e.g., any cultural activity, physical activity, and/or other event). In another embodiment, the plurality of contextual inputs include characteristics of one or more recently captured images associated with the client and/or at least one entity associated with the client (e.g., optionally obtained via profile data associated with the client). In a further embodiment, the plurality of contextual inputs include characteristics of one or more recently captured images associated with at least one entity in the location(s) in which the at least one captured image is taken (e.g., crowdsourced recently captured images). In a further embodiment, the plurality of contextual inputs include any speech uttered by the client, any speech uttered by at least one entity associated with the client, and/or any speech otherwise associated with the client. In a further embodiment, the plurality of contextual inputs include any gesture (e.g., visual gesture) made by the client, any gesture made by at least one entity associated with the client, and/or any gesture otherwise associated with the client. Additionally or alternatively, the plurality of contextual inputs include any speech associated with the location(s) and/or environment(s) in which the at least one captured image is taken. Such speech optionally includes a stated purpose related to the at least one captured image and/or a comment related to the environment(s) in which the at least one captured image is taken. In a further embodiment, the plurality of contextual inputs include any music associated with the client and/or any music associated with the environment(s) in which the at least one captured image is taken (e.g., a song including lyrics about mountains played by the client may be associated with any discrete object among the plurality of discrete objects related to mountains). In a further embodiment, the plurality of contextual inputs include social media preferences of the client and/or at least one entity associated with the client, e.g., image preferences within social media photos and/or interests derived from social media photos, publicly available messages, or content posts.

In an embodiment, the image analysis application assigns relevancy score as an integer value on a predefined and/or normalized scale, e.g., a predefined scale of 0 to 100, with '0' indicating minimum relevancy, '50' indicating moderate relevancy, and '100' indicating maximum relevancy. Alternatively, the image analysis application assigns relevancy score as a decimal value on a predefined and/or normalized scale, e.g., a predefined scale of 0.0 to 1.0, with '0.0' indicating minimum relevancy, '0.5' indicating moderate relevancy, and '1.0' indicating maximum relevancy. Additionally or alternatively, the image analysis application assigns relevancy score as a percentage value on a predefined and/or normalized scale, e.g., a predefined scale of 0% to 100%, with 0% indicating minimum relevancy, 50% indicating moderate relevancy, and 100% indicating maximum relevancy. In another embodiment, the image analysis application assigns relevancy score to a discrete object among the plurality of discrete objects based upon a comparison of any representation of the discrete object in respective contextual input(s) with information pertaining to the discrete object in the image capture learning model, e.g., information in a defined profile associated with the discrete object. A method of assigning a relevancy score to each of the plurality of discrete objects in the at least one captured image in accordance with step 220 is described with respect to FIG. 5.

At step 225, the image analysis application determines at least one captured image modification option. Each of the at least one captured image modification option determined at step 225 includes at least one photographic adjustment to the plurality of discrete objects in the at least one captured image based upon assigned relevancy score. In an embodiment, the at least one photographic adjustment includes at least one adjustment to the photographic parameters associated with the at least one captured image. According to such embodiment, the at least one photographic adjustment optionally includes at least one resolution adjustment with respect to one or more of the plurality of discrete objects. Such at least one resolution adjustment optionally include increasing resolution (e.g., decreasing blur effect) of relatively more relevant discrete object(s) and/or decreasing resolution (e.g., increasing blur effect) of relatively less relevant discrete object(s). Additionally or alternatively, the at least one photographic adjustment includes at least one focal adjustment with respect to one or more of the plurality of discrete objects. Such at least one focal adjustment optionally includes increasing focus of relatively more relevant discrete object(s) and/or decreasing focus of relatively less relevant discrete object(s). Additionally or alternatively, the at least one photographic adjustment includes at least one contrast adjustment with respect to one or more of the plurality of discrete objects. Such at least one contrast adjustment optionally includes increasing contrast of relatively more relevant discrete object(s) and/or decreasing contrast of relatively less relevant discrete object(s). Additionally or alternatively, the at least one photographic adjustment includes at least one color adjustment, e.g., increasing or decreasing color vividness/saturation and/or changing color with respect to one or more of the plurality of discrete objects. Such at least one color adjustment optionally includes emphasizing color (e.g., increasing color brightness color and/or increasing color vividness/saturation) of relatively more relevant discrete object(s) and/or deemphasizing color of relatively less relevant discrete object(s) (e.g., decreasing color brightness, applying a monochrome effect, and/or decreasing color vividness/saturation). Additionally or alternatively, the at least one photographic adjustment includes at least one zoom level adjustment with respect to one or more of the plurality of discrete objects. Such at least one zoom level adjustment optionally includes increasing zoom upon or within a predefined vicinity of relatively more relevant discrete object(s) and/or decreasing zoom upon or within a predefined vicinity of relatively less relevant discrete object(s). Additionally or alternatively, with respect to one or more of the plurality of discrete objects and/or with respect to overall aspects of the at least one captured image, the at least one photographic adjustment optionally includes at least one depth of field adjustment (e.g., changing focus with respect to one or more focal layer of the at least one captured image) and/or at least one tilt-shift adjustment.

In an embodiment, the image analysis application determines the at least one captured image modification option by prioritizing the plurality of discrete objects based upon relevancy score. According to such embodiment, the image analysis application designates increased focus, increased resolution (e.g., decreased blur effect), higher contrast, more vivid color, and/or higher zoom to one or more discrete objects having a relatively higher relevancy score. Conversely, according to such embodiment, the image analysis application designates decreased focus, decreased resolution (e.g., increased blur effect), lower contrast, less vivid/monochrome color, and/or lower zoom to one or more discrete objects having a relatively higher relevancy score. In a further embodiment, the at least one captured image modification option includes multiple captured image modification options. According to such further embodiment, the image analysis application determines the multiple captured image modification options responsive to assigning respective relevancy scores to multiple discrete objects that differ by less than a predetermined relevancy similarity threshold. Optionally, such predetermined relevancy similarity threshold is a designated percentage difference value determined by a percentage difference formula. When relevancy scores of multiple discrete objects differ by less than the predetermined relevancy similarity threshold (e.g., differ by less than a designated percentage difference value), multiple discrete objects may be of similar relevance to the client, in which case the multiple captured image modification options may permit the client to manually select an option that is most relevant, e.g., via a selection setting in the client interface. For instance, in the event that the image analysis application identifies two discrete objects in the at least one captured image (e.g., a mountain and a tree) and assigns a relevancy score to each of the two discrete objects that differ by less than the predetermined relevancy similarity threshold, the image analysis application may present to the client two captured image modification options, each respective option emphasizing one of the two discrete objects relative to the other, thus permitting the client to select among the two options. According to such instance, one option may increase relative prominence of the mountain while decreasing relative prominence of the tree, and the other option may increase relative prominence of the tree while decreasing relative prominence of the mountain. In another instance, in the event that the image analysis application identifies two discrete objects in the at least one captured image and assigns a relevancy score to each of the two discrete objects that differ by less than the predetermined relevancy similarity threshold, the image analysis application may present to the client three captured image modification options, two of the three options emphasizing one of the two discrete objects relative to the other, and the other option emphasizing the two discrete objects equally, thus permitting the client to select among the three options. By determining at least one captured image modification option, the image analysis application provides the client an option to adjust post-capture image parameters with respect to the at least one captured image in view of the image capture learning model. In the context of the various embodiments, post-capture image parameters pertain to digital image adjustments made following capture.

At step 230, the image analysis application presents to the client the at least one captured image modification option. In an embodiment, the image analysis application presents to the client the at least one captured image modification option by displaying in the client interface of the image capture device a graphical representation of the at least one captured image modification option. The client interface optionally includes a viewfinder of the image capture device and/or another screen operatively coupled to or otherwise associated with the image capture device. The client interface optionally includes a graphical display capable of presenting GUI or CLI elements for client interaction. Such graphical display optionally includes a form response interface element, e.g., including graphical control elements such as radio button(s), drop down menu(s), and/or check box(es) to facilitate selection by the client of one or more of the at least one captured image modification option. Additionally or alternatively, the client interface includes one or more sensory elements capable of speech recognition and/or gesture recognition to facilitate selection by the client of one or more of the at least one captured image modification option. In a further embodiment, the image analysis application facilitates photographic adjustment and/or any other relevant update of the at least one captured image based upon selection by the client of a captured image modification option among the at least one captured image modification option.

Optionally, at step 235, the image analysis application facilitates at least one further photographic adjustment to the at least one captured image. In an embodiment, the image analysis application facilitates at least one further photographic adjustment to the at least one captured image at step 235 based upon at least one command received from the client. The at least one further photographic adjustment optionally includes at least one adjustment to the photographic parameters associated with the at least one captured image and/or the plurality of discrete objects therein. The image analysis application optionally receives one or more of at least one command via client speech, e.g., an utterance by the client to increase color saturation of one or more of the plurality of discrete objects of the at least one captured image. Additionally or alternatively, the image analysis application receives one or more client visual gestures, e.g., a hand gesture to focus the at least one captured image upon a certain object. Additionally or alternatively, the image analysis application receives one or more of the at least one command via an interface-based submission by the client, e.g., a GUI control element selection by the client to adjust zoom level or a CLI text command submitted by the client to increase contrast. In a further embodiment, the image analysis application updates the image capture learning model based upon the at least one command from the client. In such context, the at least one command is feedback that facilitates training of the image capture learning model based upon a feedback learning loop.

In a further embodiment, the image analysis application facilitates at least one further photographic adjustment to the at least one captured image at step 235 based upon data collected by the at least one monitoring sensor. According to such further embodiment, IoT monitoring sensors on the image capture device or one or more other devices associated with the client monitor conditions in real time within a predefined vicinity of image capture in order to collect sensor data for facilitating further photographic adjustment, e.g., in view of the image capture learning model. The sensor data optionally pertains to client audiovisual input, e.g., client speech (e.g., captured via a microphone sound sensor), client video (e.g., captured via a camera video sensor), and/or client gesture (e.g., captured via a camera photographic sensor or a camera video sensor). According to such further embodiment, the data collected by the at least one monitoring sensor optionally includes speech, video, and/or gestures from the client and/or from an entity associated with the client. Such speech or video may be in the context of informal conversation (e.g., a conversation about an image capture location) or alternatively may be directed to image capture (e.g., a voice command or a visual gesture).

In a further embodiment, the sensor data pertains to environmental factors within a predefined vicinity of image capture, e.g., weather or air quality, based upon which the image analysis application may facilitate further adjustment. For instance, the image analysis application may adjust contrast of the at least one captured image and/or the plurality of discrete objects therein upon determining via sensor data that the weather is cloudy. In another instance, the image analysis application may adjust color of the at least one captured image and/or the plurality of discrete objects therein upon determining via sensor data that the air quality is low due to smoke.

Optionally, at step 240 the image analysis application facilitates at least one adjustment for subsequent image capture. In an embodiment, the image analysis application facilitates adjustment of at least one pre-capture image parameter at step 240 in view of the image capture learning model prior to capture of a subsequent image via the image capture device. According to such embodiment, in view of processing of the at least one captured image, the image analysis application optionally facilitates adjustment of at least one pre-capture image parameter associated with the image capture device (e.g., optical zoom, digital zoom, focus, etc.) based upon one or more aspects of the image capture learning model prior to capture of a subsequent image by or through the image capture device. The image analysis application optionally relays at least one control signal to a relevant control component of the image capture device in order to facilitate such adjustment. Additionally or alternatively, responsive to the client aiming the image capture device toward a scene prior to capturing a subsequent image, the image analysis application facilitates adjustment of at least one pre-capture image parameter such that the image capture device emphasizes photographic parameters of any discrete object detected within the scene determined to be more relevant to the client based upon the image capture learning model. For instance, assuming that a scene includes a tiger and further assuming that a tiger is of relatively high relevance to the client per the image capture learning model, the image analysis application may facilitate adjustment of the pre-capture image parameters of the image capture device such that the image capture device focuses upon, zooms in upon, and/or otherwise emphasizes the tiger for purposes of subsequent image capture. The image analysis application optionally facilitates adjustment of at least one pre-capture image parameter in view of the image capture learning model prior to capture of a subsequent image based upon data collected by the at least one monitoring sensor. For instance, assuming that the client discusses a deer while sitting in a car and aims the image capture device toward the deer, based upon sensor data collected pertaining to the client deer discussion, the image analysis application optionally facilitates adjustment of at least one pre-capture image parameter such that the image capture device focuses upon, zooms in upon, and/or otherwise emphasizes the deer for purposes of subsequent image capture.

In a further embodiment, the image analysis application facilitates adjustment of at least one element of photographic equipment at step 240 in view of the image capture learning model prior to capture of a subsequent image via the image capture device. According to such further embodiment, the image analysis application optionally facilitates adjustment of a gimbal and/or other photographic stabilization component attached to or otherwise associated with the image capture device. The image analysis application optionally relays at least one control signal to the gimbal and/or other photographic stabilization component in order to facilitate such adjustment. Additionally or alternatively, based upon the image capture learning model, the image analysis application optionally facilitates execution of autonomous or semi-autonomous adjustment of photographic equipment for subsequent image capture. Additionally or alternatively, based upon the image capture learning model, the image analysis application provides to the client at least one photographic equipment adjustment instruction, e.g., via the client interface of the image capture device and/or via another client communication channel.

Figure 3:
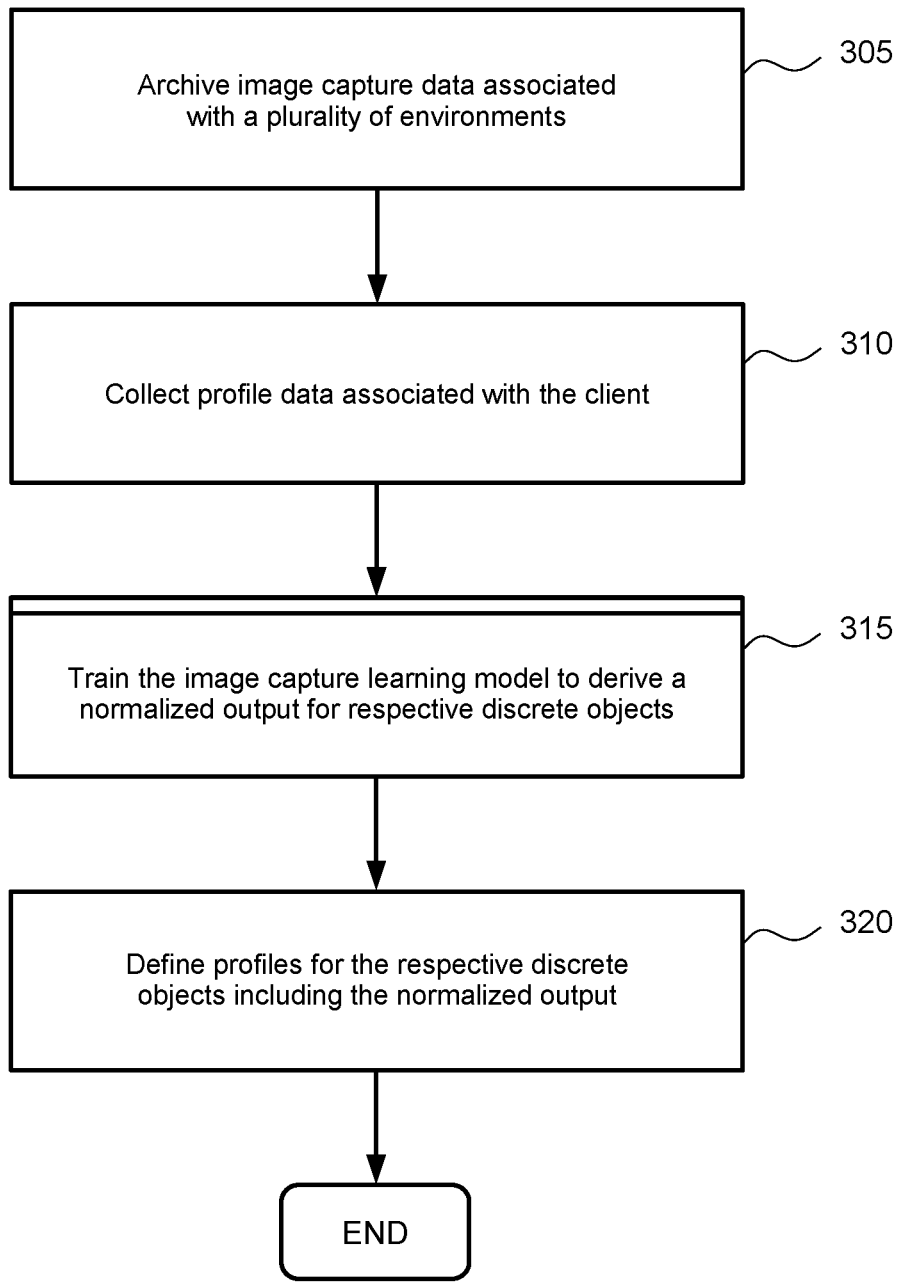
FIG. 3 illustrates a method of constructing an image capture learning model, according to one or more embodiments.

FIG. 3 illustrates a method 300 of constructing the image capture learning model. The method 300 provides one or more example embodiments with respect to step 205 of the method 200. The method 300 begins at step 305, where the image analysis application archives image capture data associated with a plurality of environments. In an embodiment, the archived image capture data includes previously captured images (e.g., photographs or video frames) having a variety of photographic parameters adjusted based upon location, date, subject, environmental focus, scenery, etc. Physical aspects of the plurality of environments optionally include natural environment(s), indoor/outdoor structural environment(s), parkland/amusement environment(s), etc. The previously captured images optionally are crowd-sourced (e.g., obtained from multiple sources). In another embodiment, the image analysis application parses aspects of the previously captured images to determine metadata associated therewith. In a further embodiment, the archived image capture data is stored in the at least one knowledge base associated with the image capture learning model.

At step 310, the image analysis application collects profile data associated with the client. In an embodiment, the profile data associated with the client includes client interests, e.g., obtained via social networking profile(s) and/or other information associated with the client made public with client consent. Such profile data optionally includes one or more social media content posts authored by or otherwise associated with the client. Additionally or alternatively, the profile data associated with the client includes client image capture preferences, e.g., directly obtained via client input and/or derived based upon one or more previously captured images associated with the client. In a further embodiment, the collected profile data associated with the client is stored in the at least one knowledge base associated with the image capture learning model.

At step 315, the image analysis application trains the image capture learning model based upon the archived image capture data and the collected profile data associated with the client to derive a normalized output for respective discrete objects. The image analysis application identifies the respective discrete objects in the context of model training. In an embodiment, the image analysis application trains the image capture learning model by parsing metadata from the archived image capture data and the collected profile data associated with the client and applying at least one machine learning algorithm. In the context of the various embodiments, the parsed metadata is defined to include any aspect with respect to image capture, including but not limited to image date/time, image location, and/or photographic parameters. According to such embodiment, the at least one machine learning algorithm includes at least one deep learning algorithm based on artificial neural networks. According to such embodiment, the at least one machine learning algorithm optionally includes at least one audiovisual processing algorithm and/or at least one NLP algorithm. In a further embodiment, during the process of model training the image analysis application identifies the respective discrete objects based upon parsing previously captured images included or otherwise represented in the archived image capture data. According to such further embodiment, the image analysis application parses photographic parameters with respect to one or more previously captured images and the determined discrete objects therein. Additionally or alternatively, the image analysis application identifies the respective discrete objects based upon parsing previously captured images included in the collected profile data associated with the client. The image analysis application parses one or more previously captured images to determine resolution/blur level, focus, contrast, color, zoom level, depth of field setting, and/or tilt-shift setting with respect to the images and/or discrete objects therein. The image analysis application optionally parses one or more previously captured images by focal layer and classifies the discrete objects therein based upon focal layer. A method of training the image capture learning model in accordance with step 315 is described with respect to FIG. 4.

At step 320, the image analysis application defines profiles for the respective discrete objects including the normalized output. In an embodiment, a discrete object profile for a respective discrete object includes at least one relevancy pattern based upon the normalized output derived for the respective discrete object. According to such embodiment, the image analysis application optionally determines aspects of the at least one relevancy pattern based upon and/or in conjunction with the normalized output derived via training the image capture learning model. Based upon information included in the normalized output, the image analysis application optionally determines correlations between the respective discrete object and other discrete objects and incorporates such correlations into the at least one relevancy pattern. Specifically, the at least one relevancy pattern includes relationships between the respective discrete object and other discrete objects. Such relationships optionally include relative position of the respective discrete object in one or more previously captured images with respect to other discrete objects and/or correlations between photographic parameters of the respective discrete object and other discrete objects. Additionally or alternatively, the at least one relevancy pattern includes relationships between the respective discrete object and the client, e.g., information associated with any image taken by the client including the respective discrete object. For instance, in the event that the respective discrete object is a mountain, the at least one relevancy pattern included in the discrete object profile of the mountain may include information with respect to any previously captured image taken by the client including the mountain. Additionally or alternatively, the at least one relevancy pattern includes relationships between the respective discrete object and other entities (individuals or groups) associated with one or more previously captured images. In a further embodiment, the at least one relevancy pattern includes a listing of previously captured images including the respective discrete object as well as location information associated with such images, date/time information with respect to such images, and/or photographic parameters of such images and/or discrete objects therein. Further, the at least one relevancy pattern optionally includes any correlations among the location information, the date/time information, and/or the photographic parameters.

In an embodiment, the discrete object profile for a respective discrete object is associated with (e.g., includes) a relevancy score definition determined for the respective discrete object based upon the at least one relevancy pattern.

According to such embodiment, the relevancy score definition includes rules for assigning a relevancy score to an instance of the respective discrete object within a captured image based upon location of the captured image, date/time of the captured image, and/or photographic parameters of the captured image (e.g., depth of field setting and/or tilt-shift setting) and/or discrete objects therein (e.g., resolution/blur level, focus, contrast, color, and/or zoom level). Additionally or alternatively, the relevancy score definition includes rules for assigning a relevancy score to an instance of the respective discrete object within a captured image based upon relationships between the discrete object and other discrete objects. Additionally or alternatively, the relevancy score definition includes rules for assigning a relevancy score to an instance of the respective discrete object within a captured image based upon relationships between the respective discrete object and the client and/or relationships between the discrete object and other entities associated with one or more previously captured images. Additionally or alternatively, the relevancy score definition includes rules for assigning a relevancy score to an instance of the respective discrete object within a captured image based upon preferences of the client in terms of location, date/time, and/or photographic parameters. For instance, the relevancy score definition rules may prioritize any location or date of significance to the client, e.g., a location about which the client posts on social media or a special date designated by the client. Accordingly, the image analysis application may assign a relatively higher relevancy score to an instance of the respective discrete object per the relevancy score definition rules responsive to determining that such instance is associated with a location or date of significance to the client.

Figure 4:
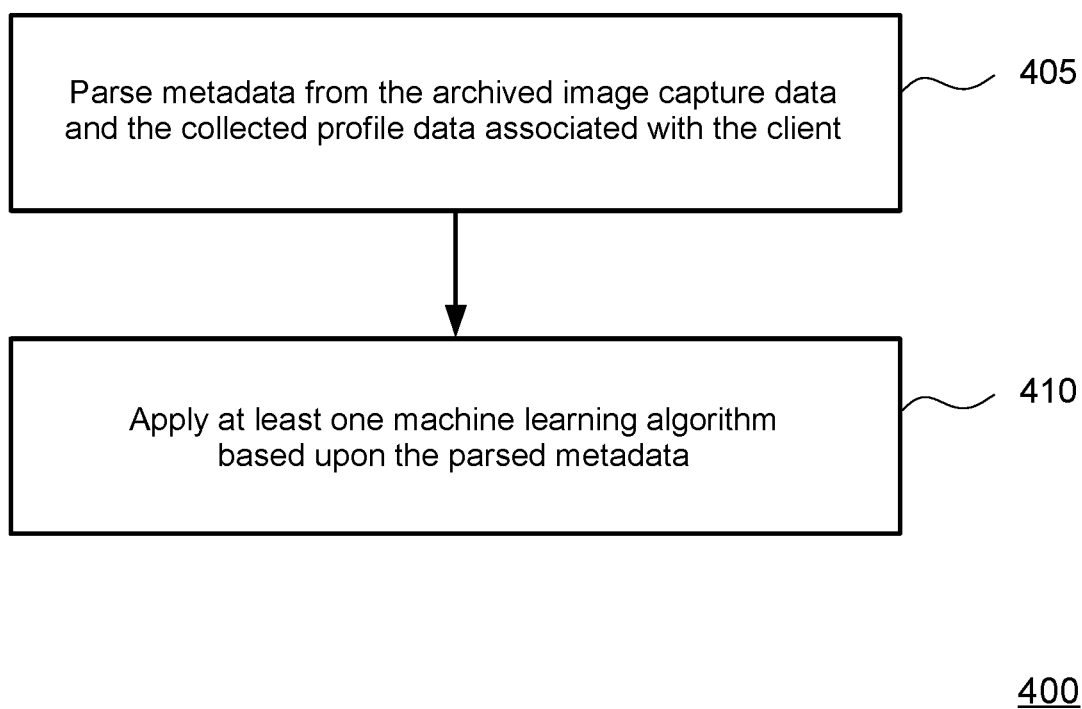
FIG. 4 illustrates a method of training an image capture learning model, according to one or more embodiments.

FIG. 4 illustrates a method 400 of training the image capture learning model. The method 400 provides one or more example embodiments with respect to step 315 of the method 300. The method 400 begins at step 405, where the image analysis application parses metadata from the archived image capture data and the collected profile data associated with the client. In an embodiment, the image analysis application trains the image capture learning model by deriving metadata from the archived image capture data (e.g., metadata related to one or more previously captured images) and the collected profile data associated with the client (e.g. metadata related to the client) and determining correlations and distinctions among previously captured image datapoints and the client datapoints. The parsed metadata includes location data, date/time data, and/or directional information related to one or more previously captured images associated with the archived image capture data and/or the collected profile data associated with the client. Additionally or alternatively, the parsed metadata includes photographic parameters associated with one or more previously captured images (e.g., depth of field setting and/or tilt-shift setting) and/or respective discrete objects therein (e.g., resolution/blur level, focus, contrast, color, and/or zoom level). Additionally or alternatively, the parsed metadata optionally includes focal layer information with respect to one or more previously captured images and/or respective discrete objects therein.

At step 410, the image analysis application applies at least one machine learning algorithm based upon the parsed metadata derived from the archived image capture data and the collected profile data associated with the client. In an embodiment, the image analysis application derives respective inputs of the at least one machine learning algorithm from the parsed metadata. The image analysis application encodes the respective inputs into a computer format, e.g., numerical values representing deep learning input neurons, for purposes of applying the at least one machine learning algorithm. In a further embodiment, in the context of step 410 the image analysis application determines contextual details associated with the archived image capture data and/or the collected profile data associated with the client by applying at least one audiovisual processing machine learning algorithm to inputs derived from parsed image metadata (e.g., associated with one or more previously captured images) and/or parsed audiovisual metadata. According to such further embodiment, the image analysis application identifies respective discrete objects in one or more previously captured images by applying at least one object detection algorithm. One object detection algorithm option is a R-CNN algorithm. The image analysis application optionally determines whether a respective discrete object in one or more previously captured images is visible (e.g., in terms of resolution) based upon application of a R-CNN algorithm in conjunction with analysis of any Boolean metadata pertaining to the respective discrete object. Another object detection algorithm option is a YOLO algorithm. Additionally or alternatively, the image analysis application determines resolution adjustment patterns among respective discrete objects in one or more previously captured images by applying at least one classification machine learning algorithm and/or at least one clustering machine learning algorithm. The image analysis application determines type and/or degree of resolution adjustment (e.g., type and/or degree of a blurring effect) among respective discrete objects by applying a classification algorithm. Additionally or alternatively, the image analysis application determines level of resolution adjustment among respective discrete objects by applying a quality threshold (QT) clustering algorithm.

In a further embodiment, in the context of step 410 the image analysis application determines contextual details associated with the archived image capture data and/or the collected image profile data by applying at least one NLP machine learning algorithm to inputs derived from parsed textual metadata. Optionally, the image analysis application processes results from application of the at least one NLP algorithm via NLU in order to enhance machine reading comprehension. Additionally or alternatively, the image analysis application classifies image capture data based upon textual analysis by applying NLP, e.g., LDA, to image descriptions (captions) and/or image textual metadata. In another embodiment, the image analysis application applies the at least one machine learning algorithm at step 410 in conjunction with a recurrent neural network architecture configured to store time series pattern data associated with the parsed textual metadata derived from the archived image capture data and/or the collected profile data associated with the client. In the context of the various embodiments, a recurrent neural network architecture is a gating mechanism configured to store time series pattern data. Optionally, in the context of NLP, the image analysis application trains the image capture learning model in conjunction with a long short-term memory recurrent neural network (LSTM-RNN) architecture configured to store time series pattern data with respect to textual metadata aspects. The image analysis application optionally applies LSTM-RNN modeling for purposes of storing the time series pattern data. The image analysis application in the context of LSTM-RNN modeling stores usage characteristics as a function of time for each textual metadata aspect that can be used as input for at least one machine learning algorithm in the context of training the image capture learning model (e.g., an NLP-based algorithm). Based upon usage characteristics with respect to the textual metadata aspects over time, the image analysis application optionally uses LSTM-RNN data to predict patterns among the textual metadata aspects, e.g., client language patterns over time with respect to one or more previously captured images and/or discrete objects therein. Specifically, using LSTM-RNN modeling, the image analysis application optionally derives at least one timestamped pattern with respect to one or more of the textual metadata aspects, thus identifying captured image patterns based upon timestamps. Alternatively, in the context of NLP, the image analysis application trains the image capture learning model in conjunction with a gated recurrent unit (GRU) architecture.

In an embodiment, in the context of applying the at least one machine learning algorithm at step 410, the image analysis application applies an activation function (e.g., an activation function of artificial neurons, such as a sigmoid function) in order to obtain the normalized output for the respective discrete objects identified in the context of model training. The activation function serves to normalize the results obtained through application of the at least one machine learning algorithm. The normalized output of the activation function for a respective discrete object is a set of normalized output values, e.g., a set of normalized numerical values between 0 and 1. Each of the set of normalized output values corresponds to a photographic parameter and/or other parameter (e.g., a location parameter, a date/time parameter, etc.) associated with the respective discrete object. In an embodiment, each normalized output value corresponding to a photographic parameter optionally represents a baseline value (e.g., an average value or a median value) of the photographic parameter in the context of the archived image capture data and/or the client profile data associated with the respective discrete object. For instance, the normalized output from the activation function for the respective discrete object may be a set of normalized numerical values, including a value indicating baseline photographic color of the respective discrete object, a value indicating baseline contrast of the respective discrete object, a value indicating baseline zoom level of the respective discrete object, etc. Accordingly, by applying the at least one machine learning algorithm in conjunction with the activation function, the image analysis application creates a set of normalized values for each respective discrete object for purposes of comparing photographic parameters and/or other parameters associated with the respective discrete objects.

Figure 5:
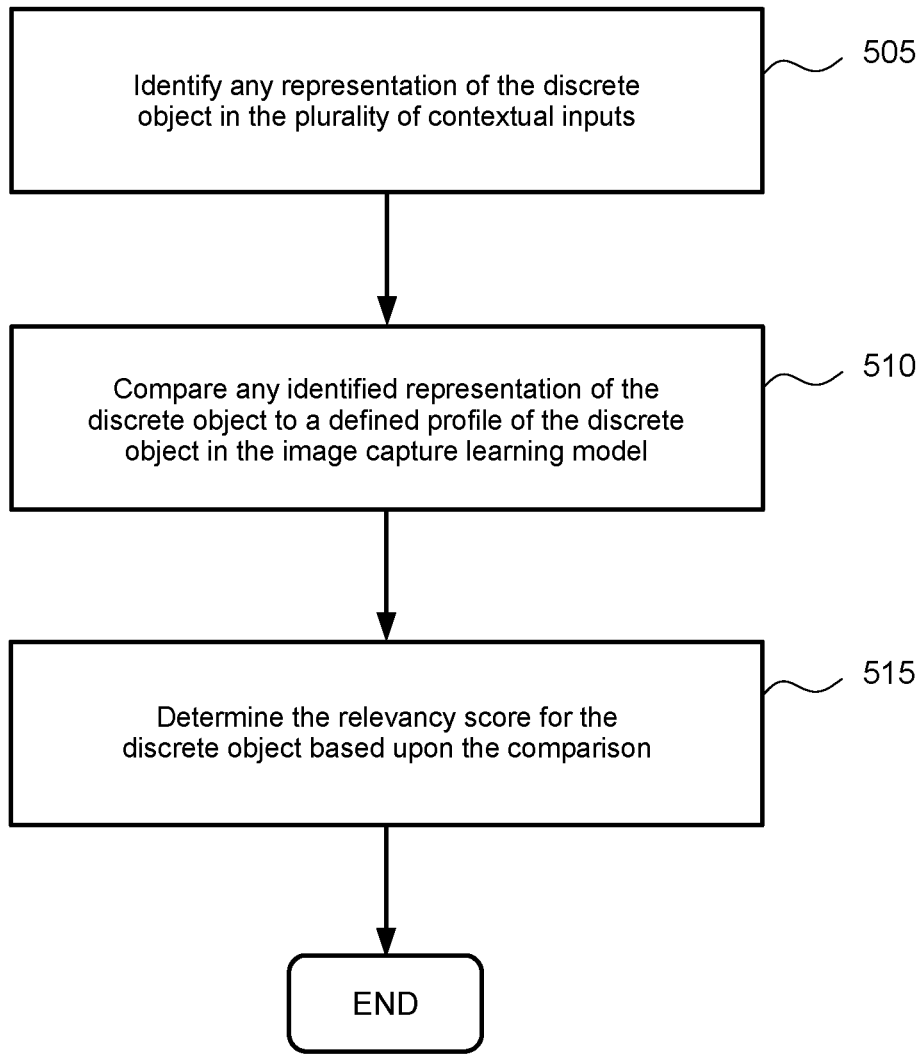
FIG. 5 illustrates a method of assigning a relevancy score to each of a plurality of discrete objects in at least one captured image, according to one or more embodiments.

FIG. 5 illustrates a method 500 of assigning a relevancy score to each of the plurality of discrete objects in the at least one captured image. The method 500 provides one or more example embodiments with respect to step 220 of the method 200. The method 500 begins at step 505, where the image analysis application identifies any representation of the discrete object in the plurality of contextual inputs. In an embodiment, the image analysis application identifies any such representation based upon audiovisual processing of one or more of the plurality of contextual inputs, e.g., processing of visual and/or audio aspects associated with one or more recently captured images. Additionally or alternatively, the image analysis application identifies any such representation based upon NLP, e.g., NLP of any textual description and/or metadata associated with the at least one captured image and/or the location(s)/environment(s) in which the at least one captured image is taken. Additionally or alternatively, the image analysis application identifies any such representation based upon speech recognition, e.g., interpretation of speech uttered by the client or otherwise associated with the client and/or speech associated with the location(s), date(s)/time(s), and/or environment(s) in which the at least one captured image is taken. Additionally or alternatively, the image analysis application identifies any such representation based upon gesture recognition, e.g., interpretation of gestures made by the client or otherwise associated with the client.

At step 510, the image analysis application compares any identified representation of the discrete object in the plurality of contextual inputs to a defined profile of the discrete object in the image capture learning model. In an embodiment, the image analysis application compares attributes of any identified representation to analogous attributes associated with the defined profile of the discrete object. According to such embodiment, the image analysis application optionally compares location information or date/time information derived from any identified representation to analogous location information or analogous date/time information included in the defined profile of the discrete object. For instance, the image analysis may compare any location and/or date/time derived from any identified representation to any location or date/time of relevance to the client included in the defined profile of the discrete object. Additionally or alternatively, the image analysis application compares photographic parameters derived from any identified representation of the discrete object (e.g., resolution/blur level, focus, contrast, color, and/or zoom level) to analogous photographic parameters included in the defined profile of the discrete object. Additionally or alternatively, the image analysis application determines based on any identified representation relationships of the discrete object and compares such determined relationships to analogous relationships stored or otherwise represented in the defined profile of the discrete object. Such relationship comparison optionally includes comparison of relationships between the discrete object and other discrete objects. Additionally or alternatively, such relationship comparison optionally includes comparison of relationships between the discrete object and the client, relationships between the discrete object and other entities (e.g., individuals or groups) associated with the client, and/or relationships between the discrete object and other entities associated with image capture attributes as stored in the defined profile of the discrete object.

At step 515, the image analysis application determines the relevancy score for the discrete object based upon the comparison. In an embodiment, upon comparing attributes of any identified representation to analogous attributes associated with the defined profile of the discrete object, the image analysis application optionally determines the relevancy score for the discrete object according to rules included in the relevancy score definition associated with the defined profile of the discrete object. The image analysis application optionally determines relevance of the discrete object based upon location(s) and/or date(s)/time(s) associated with the at least one captured image. Per the rules included in the relevancy score definition, the image analysis application optionally determines a relatively higher relevancy score for the discrete object responsive to an association of the discrete object with a location or a date/time of relatively greater relevance to the client. Additionally or alternatively, in the event that the discrete object is associated with certain photographic parameters as determined from one or more of the plurality of contextual inputs (e.g., as determined via one or more recently captured images taken at a certain location and/or as determined via speech uttered by the client), the image analysis application determines the relevancy score for the discrete object per the rules included in the relevancy score definition based upon comparing the photographic parameters determined from the contextual input representations of the discrete object to analogous photographic parameters reflected in at least one relevancy pattern included in the defined profile of the discrete object. Additionally or alternatively, the image analysis application determines the relevancy score for the discrete object per the rules included in the relevancy score definition based upon comparing any determined relationships of the discrete object to analogous relationships stored in the defined profile of the discrete object. The image analysis application optionally determines relative relevance of the discrete object with respect to other discrete objects. Responsive to determining via the comparison that the discrete object is a relatively more prominent discrete object among discrete objects in terms of photographic parameters and/or relationships, the image analysis application determines a relatively higher relevancy score for the discrete object. Conversely, responsive to determining via the comparison that the discrete object is a relatively less prominent discrete object among discrete objects in terms of photographic parameters and/or relationships, the image analysis application determines a relatively lower relevancy score for the discrete object. In a further embodiment, the image analysis application determines the relevancy score at least in part based upon a quantity of identified representations of the discrete object in the plurality of contextual inputs. For instance, the image analysis application may calculate a relatively higher relevancy score based upon a relatively greater number of identified representations of the discrete object in the plurality of contextual inputs and conversely may calculate a relatively lower relevancy score based upon a relatively fewer number of identified representations.

In the context of an example image capture scenario involving a Client A, per step 205 the image analysis application constructs an image capture learning model based upon data collection. Specifically, per steps of the method 300, the image analysis application constructs the image capture learning model by archiving image capture data associated with a plurality of environments (e.g., crowdsourced data and/or previously captured image data related to Client A), collecting profile data associated with Client A, training the model to derive a normalized output for respective discrete objects, and defining profiles for the respective discrete objects including the normalized output. Per step 210, the image analysis application receives, via at least one lens of an image capture device, at least one captured image from Client A. Per step 215, the image analysis application parses the at least one captured image to identify a plurality of discrete objects. Assuming that the at least one captured image includes a mountain, an oak tree, and a friend of Client A, and assuming that a plurality of contextual inputs include speech from Client A discussing an oak tree themed gift on a wedding day, a Client A social media content post discussing benefits of an oak tree, music played by Client A referencing a mountain, and a Client A social media photograph having a caption referencing a mountainous landscape viewed on a birthday, per step 220 the image analysis application assigns respective relevancy scores to each of the plurality of discrete objects based upon analysis of the plurality of contextual inputs in view of the image capture learning model. Since the plurality of contextual inputs emphasize the oak tree and the mountain relative to the friend, per step 220 and more specifically per the steps of the method 500, the image analysis application may assign higher relevancy scores to the oak tree and the mountain relative to the friend per rules included in relevancy score definitions associated with a respective oak tree discrete object and a respective mountain discrete object due to the relatively greater number of identified representations of the oak tree and the mountain in the plurality of contextual inputs and furthermore due to both the oak tree and the mountain being associated with dates of relatively greater relevance to Client A (since an oak tree is associated with a wedding and a mountainous landscape is associated with a birthday per the contextual inputs).

Per step 225, the image analysis application determines in the context of the example scenario at least one captured image modification option including at least one photographic adjustment. Assuming that the respective relevancy scores assigned to the oak tree and the mountain differ by less than a predetermined relevancy similarity threshold, the image analysis application may present up to three captured image modification options to Client A, including a first option emphasizing the oak tree relative to the other discrete objects, a second option emphasizing the mountain relative to the other discrete objects, and (optionally) a third option emphasizing both the oak tree and the mountain relative to the friend. In all three captured image modification options, the oak tree and the mountain each may be emphasized relative to the friend due to higher respective relevancy scores assigned to the oak tree and the mountain relative to the friend. The emphasis of one discrete object relative to the others may entail emphasizing one or more photographic parameters of such discrete object (e.g., increasing resolution, increasing focus, increasing contrast, etc.). Per step 230, the image analysis application presents to Client A the captured image modification options, e.g., via a viewfinder of the image capture device. Accordingly, Client A may select one or more of the captured image modification options, depending upon whether Client A prefers emphasis of the oak tree, emphasis of the mountain, or (optionally) emphasis of both the oak tree and the mountain in the at least one captured image.

Optionally, per step 235 the image analysis application may facilitate at least one further photographic adjustment to the at least one captured image in the context of the example scenario, e.g., based upon at least one comment received from Client A and/or based upon data collected by at least one monitoring sensor associated with the image capture device of Client A. Optionally, per step 240, the image analysis application may facilitate at least one adjustment for subsequent image capture. For instance, the image analysis application may facilitate adjustment of at least one pre-capture image parameter in view of the image capture learning model and/or may facilitate adjustment of at least one element of photographic equipment (e.g., a gimbal) in view of the image capture learning model prior to capture of a subsequent image via the image capture device of Client A.

The descriptions of the various embodiments of the present invention have been presented for purposes of illustration but are not intended to be exhaustive or limited to the embodiments disclosed. All kinds of modifications made to the described embodiments and equivalent arrangements should fall within the protected scope of the invention. Hence, the scope of the invention should be explained most widely according to the claims that follow in connection with the detailed description and should cover all possibly equivalent variations and equivalent arrangements. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
constructing an image capture learning model based upon data collection;
receiving, via at least one lens of an image capture device, at least one captured image from a client;
parsing the at least one captured image to identify a plurality of discrete objects;
assigning a relevancy score to each of the plurality of discrete objects in the at least one captured image based upon analysis of a plurality of contextual inputs in view of the image capture learning model;
determining at least one captured image modification option, wherein each of the at least one captured image modification option comprises at least one photographic adjustment to the plurality of discrete objects in the at least one captured image based upon assigned relevancy score; and
facilitating adjustment of at least one pre-capture image parameter in view of the image capture learning model prior to capture of a subsequent image via the image capture device.

2. The computer-implemented method of claim 1, further comprising:
presenting to the client the at least one captured image modification option.

3. The computer-implemented method of claim 1, further comprising:
facilitating at least one further photographic adjustment to the at least one captured image based upon at least one command received from the client.

4. The computer-implemented method of claim 1, further comprising:
facilitating at least one further photographic adjustment to the at least one captured image based upon data collected by at least one monitoring sensor.

5. The computer-implemented method of claim 1, further comprising:
facilitating adjustment of at least one element of photographic equipment in view of the image capture learning model prior to capture of a subsequent image via the image capture device.

6. The computer-implemented method of claim 1, wherein the at least one captured image is a series of captured images.

7. The computer-implemented method of claim 1, wherein constructing the image capture learning model comprises:
archiving image capture data associated with a plurality of environments;
collecting profile data associated with the client;
training the image capture learning model based upon the archived image capture data and the collected profile data associated with the client to derive a normalized output for respective discrete objects; and
defining profiles for the respective discrete objects including the normalized output.

8. The computer-implemented method of claim 7, wherein training the image capture learning model comprises:
parsing metadata from the archived image capture data and the collected profile data associated with the client; and
applying at least one machine learning algorithm based upon the parsed metadata.

9. The computer-implemented method of claim 8, wherein the at least one machine learning algorithm is applied in conjunction with a recurrent neural network architecture configured to store time series pattern data with respect to textual aspects of the archived image capture data and the collected profile data associated with the client.

10. The computer-implemented method of claim 8, wherein applying the at least one machine learning algorithm comprises applying an activation function in order to obtain the normalized output for the respective discrete objects.

11. The computer-implemented method of claim 1, wherein assigning a relevancy score to each of the plurality of discrete objects in the at least one captured image comprises:
identifying any representation of the discrete object in the plurality of contextual inputs;
comparing any identified representation of the discrete object to a defined profile of the discrete object in the image capture learning model; and
determining the relevancy score for the discrete object based upon the comparison.

12. A computer program product comprising a computer readable storage medium having program instructions embodied therewith, the program instructions executable by a computing device to cause the computing device to:
construct an image capture learning model based upon data collection;
receive, via at least one lens of an image capture device, at least one captured image from a client;
parse the at least one captured image to identify a plurality of discrete objects;
assign a relevancy score to each of the plurality of discrete objects in the at least one captured image based upon analysis of a plurality of contextual inputs in view of the image capture learning model;
determine at least one captured image modification option, wherein each of the at least one captured image modification option comprises at least one photographic adjustment to the plurality of discrete objects in the at least one captured image based upon assigned relevancy score; and
facilitate adjustment of at least one pre-capture image parameter in view of the image capture learning model prior to capture of a subsequent image via the image capture device.

13. The computer program product of claim 12, wherein the program instructions further cause the computing device to:
present to the client the at least one captured image modification option.

14. The computer program product of claim 12, wherein the program instructions further cause the computing device to:
facilitate at least one further photographic adjustment to the at least one captured image based upon at least one command received from the client.

15. The computer program product of claim 12, wherein the program instructions further cause the computing device to:
  facilitate at least one further photographic adjustment to the at least one captured image based upon data collected by at least one monitoring sensor.

16. The computer program product of claim 12, wherein the program instructions further cause the computing device to:
  facilitate adjustment of at least one element of photographic equipment in view of the image capture learning model prior to capture of a subsequent image via the image capture device.

17. A system comprising:
  a processor; and
  a memory storing an application program, which, when executed on the processor, performs an operation comprising:
    constructing an image capture learning model based upon data collection;
    receiving, via at least one lens of an image capture device, at least one captured image from a client;
    parsing the at least one captured image to identify a plurality of discrete objects;
    assigning a relevancy score to each of the plurality of discrete objects in the at least one captured image based upon analysis of a plurality of contextual inputs in view of the image capture learning model;
    determining at least one captured image modification option, wherein each of the at least one captured image modification option comprises at least one photographic adjustment to the plurality of discrete objects in the at least one captured image based upon assigned relevancy score; and
    facilitating adjustment of at least one pre-capture image parameter in view of the image capture learning model prior to capture of a subsequent image via the image capture device.

18. The system of claim 17, wherein the operation further comprises:
  presenting to the client the at least one captured image modification option.

19. The system of claim 17, wherein the operation further comprises:
  facilitating at least one further photographic adjustment to the at least one captured image based upon at least one command received from the client.

20. The system of claim 17, wherein the operation further comprises:
  facilitating at least one further photographic adjustment to the at least one captured image based upon data collected by at least one monitoring sensor.

* * * * *